United States Patent
Paun

(10) Patent No.: US 8,432,296 B2
(45) Date of Patent: Apr. 30, 2013

(54) SYSTEM AND METHOD FOR DETERRING VEHICLE THEFT AND MANAGING VEHICLE PARKING

(75) Inventor: Stefan Paun, Park Ridge, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 853 days.

(21) Appl. No.: 12/541,553

(22) Filed: Aug. 14, 2009

(65) Prior Publication Data
US 2011/0037620 A1 Feb. 17, 2011

(51) Int. Cl.
*G08G 1/14* (2006.01)

(52) U.S. Cl.
USPC .............. 340/932.2; 340/933; 340/426.1

(58) Field of Classification Search .......... 340/932.2, 340/933, 988, 425.5, 426.1, 539.1, 539.13, 340/539.16, 539.18, 539.23
See application file for complete search history.

(56) References Cited

U.S. PATENT DOCUMENTS

| | | | |
|---|---|---|---|
| 4,064,501 A * | 12/1977 | Yost et al. ............... | 340/286.06 |
| 5,955,970 A | 9/1999 | Ando et al. | |
| 5,969,641 A | 10/1999 | Nakamura et al. | |
| 6,010,074 A | 1/2000 | Kelly et al. | |
| 6,075,466 A | 6/2000 | Cohen et al. | |
| 6,097,292 A | 8/2000 | Kelly et al. | |
| 6,559,776 B2 * | 5/2003 | Katz ....................... | 340/932.2 |
| 7,019,670 B2 | 3/2006 | Bahar | |
| 7,104,447 B1 | 9/2006 | Lopez et al. | |
| 7,114,651 B2 | 10/2006 | Hjelmvik | |
| 7,237,715 B1 | 7/2007 | Firestone | |
| 2002/0008639 A1 * | 1/2002 | Dee ....................... | 340/932.2 |
| 2004/0032342 A1 | 2/2004 | Dunning | |
| 2004/0068433 A1 | 4/2004 | Chatterjee et al. | |
| 2005/0057373 A1 | 3/2005 | Noguchi | |
| 2005/0228715 A1 | 10/2005 | Hartig et al. | |
| 2005/0280555 A1 | 12/2005 | Warner, IV | |
| 2006/0255119 A1 | 11/2006 | Marchasin et al. | |
| 2007/0005226 A1 | 1/2007 | Sutardja | |
| 2007/0090971 A1 | 4/2007 | Buschman | |
| 2008/0048885 A1 | 2/2008 | Quinn | |

* cited by examiner

Primary Examiner — Anh V La

(57) ABSTRACT

At the control apparatus which is at a location external to a vehicle, a communication link is established with a transponder at the vehicle. The vehicle is located in the immediate vicinity of the location. A continued presence of the vehicle in the vicinity of the location via the communication link is monitored.

20 Claims, 5 Drawing Sheets

SYSTEM AND METHOD FOR DETERRING VEHICLE THEFT AND MANAGING VEHICLE PARKING

FIELD OF THE INVENTION

The field of the invention relates to monitoring the location of vehicles and, more specifically, to vehicle theft prevention and/or vehicle parking regulation.

BACKGROUND

Over the years, the theft of vehicles has been a continuing problem. Various attempts have been made to discourage vehicle theft. For example, various approaches have been used that attempt to lock a vehicle and thereby prevent theft. In other examples, security systems have been developed and employed in vehicles. For example, when the vehicle owner leaves their vehicle, the vehicle is locked and the security system is activated. If an unauthorized person tries to enter the car, an alarm is sounded. In some previous approaches, a signal is sent to a remote site (such as a police station) so that the intruder can be stopped and the theft of the vehicle prevented.

Unfortunately, these previous approaches have not always been successful in defeating attempts to enter and steal vehicles. For example, the sound of activated security alarm systems has become so commonplace in many areas that the sound of the alarm is often ignored and the intruder can continue with their activities unimpeded. In the case where the car alarm transmits a signal to alert security personnel, various approaches have been used by criminals to defeat this security approach. For example, the criminal may simply drape the car in some material that interferes with the transmission of the signal to the police. Then, the criminal can break into and steal the vehicle unimpeded since a transmission made by the security system of the vehicle to an external security center will never be received by the external security center.

Controlling and regulating the parking of vehicles has also been a problem in recent years. The number of vehicles on the road has increased greatly in recent times, but the number of parking places has not kept pace with demand. Various attempts have been made to allow parkers to find open spots, but these attempts have not met with success because, among other reasons, an accurate determination of the number of vehicles in a certain parking area could not be made. This leads to the frustration of the vehicle owner and other problems. Additionally, illegal parking has become an increasing concern and previous approaches have been insufficient to remedy this problem.

Figure 1:
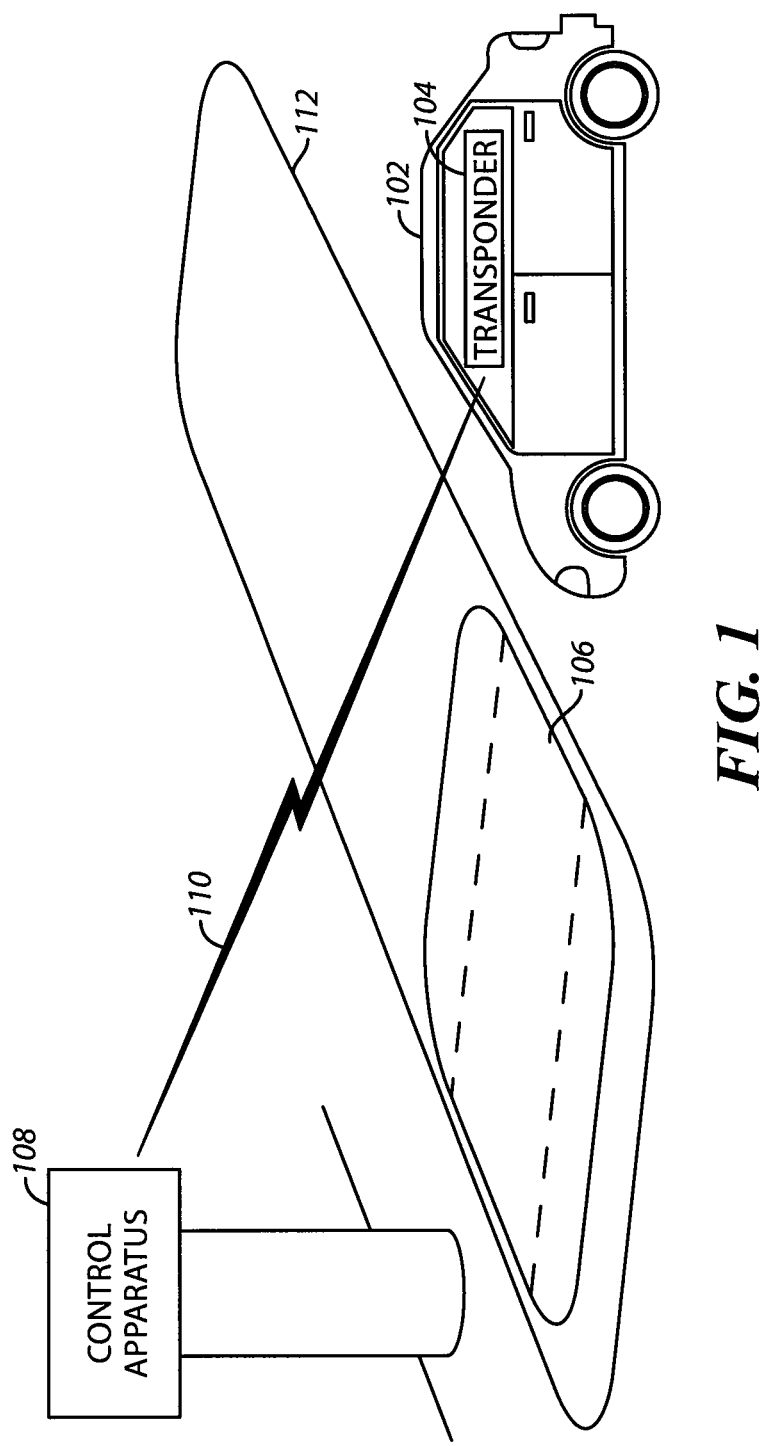
FIG. 1 comprises a block diagram of a parking and security system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where vehicle security can be provided by a control apparatus that is external to the vehicle and cannot easily be disabled by an intruder or other unauthorized individual. Consequently, reliable security protection is provided for vehicles and this security protection cannot be disabled by assaulting or interfering with the vehicle or its contents. Additionally, parking services can be provided whereby unauthorized vehicles can be prevented from occupying parking spaces and alternative parking information can be provided to a user when a given parking area is full. The approaches described herein are easy to implement and cannot be disabled by unauthorized persons tampering with a vehicle or the contents (e.g., a transponder) of the vehicle.

In many of these embodiments, at a control apparatus disposed at a location external to a vehicle, a communication link is established with a transponder at the vehicle. The vehicle is located in the immediate vicinity of the location of the control apparatus. The continued presence of the vehicle in the vicinity of the location is monitored via the communication link. The control apparatus determines whether a first valid user authorization signal has been received over the communication link. The first valid user authorization signal indicates that a user is securing the vehicle. The control apparatus then monitors for and determines when a second valid user authorization signal has been received. The second valid user authorization signal indicates the authorized departure of the vehicle from the immediate vicinity of the location of the control apparatus. When the continued presence of the vehicle is no longer detected and when a valid second user authorization signal has not been received, an alarm is initiated.

In other aspects, the monitoring for the continued presence of the vehicle is performed periodically, for example, once every minute. In other examples, an inquiry message is sent to the vehicle and the control apparatus monitors for a response message that is received from the transponder at the vehicle.

In other examples, establishing the communication link may include determining whether an identifier associated with and received from the transponder is associated with an authorized user. The first valid user authorization signal and the second valid user authorization signal may include a password and these passwords may be the same (or different). In this case, determining whether a valid user authorization signal has been received includes comparing the received password(s) to pre-stored password(s) that are known to be valid.

In still other examples, a monetary payment from the user may be received and the control apparatus responsively sends a valid password to the transponder at the vehicle. In still other approaches, a visible indicator may be actuated when the communication link is established. This indicator may be a light emitting diode (LED) to name one example. The indicator may be positioned at the vehicle or the control apparatus to name two examples.

In other aspects, at least one allowed user for at least one predetermined parking area is stored in a database. The presence of the at least one allowed user in the pre-determined parking area is monitored. A message is received from the allowed user that is attempting to park a vehicle in the at least one pre-determined parking area. When the message is received, it is determined whether the predetermined parking area is full based upon a number of vehicles indicated to be located in the predetermined parking area and a predetermined limit. When the area is determined to be full, a message is sent to an external parking control entity (e.g., a parking monitoring center, the police, another control apparatus, to name a few examples).

In others of these embodiments a parking map of the at least one predetermined parking area is constructed. The parking map may show the approximate location of vehicles and other information (e.g., the owner of the vehicle, how long the vehicle has been parked, to name two examples).

In other examples, a password is received from the at least one user to associate the at least one user to the at least one predetermined parking area. For example, the user may type their password in at a keyboard within the vehicle, at a cellular phone, using a personal digital assistant, to name a few examples. These devices communicate with the parking control apparatus and the parking control apparatus determines whether the user is a valid user and is allowed to park. Alternatively, the user may contact the control apparatus (e.g., using their cellular phone or some other wireless device) and enter payment information to pay to park.

In other examples communications are exchanged with the external parking control entity and an alternate place to park is determined based upon the information received during the communications. For example, the control apparatus may communicate with a parking control center where attendants monitor various parking areas. Alternatively, the parking control center may be automated. In any case, when a vehicle is parked illegally, appropriate personnel (e.g., the police or a tow truck) can be dispatched to ticket and/or remove the offending vehicle. The alternate parking information may also be communicated to the user to allow the user or driver to proceed to an alternate parking area.

Referring now to FIG. 1, one example of a system for providing vehicle security and/or parking control is described. A vehicle 102 includes a transponder 104. The vehicle 102 is to be parked in a parking area 106. The parking area 106 is monitored by a control apparatus 108 and may be located anywhere (e.g., a parking lot, parking garage, and so forth). As described herein, a communication link 110 is established between the control apparatus 108 and the transponder 104 in the vehicle 102.

The vehicle 102 may be any type of motorized or non-motorized vehicle such as a car, truck, bus, or the like. The transponder 104 may be placed anywhere inside or attached to the exterior of the vehicle 102. The parking area 106 (or monitored area) may be any area where the vehicle is allowed to park and may be of any size or dimension. The communication link 110 may be any wireless link and established according to any communication protocol.

The control apparatus 108 is disposed at a position external to the vehicle 102. In this respect, it is disposed at a secure location (e.g., at the end of a pole at a height not easily or conveniently unreachable by potential criminals that wish to enter the vehicle 102). The control apparatus which may include a programmed microprocessor, and antenna for communicating to the vehicle 102 may be protected from attempts to disable it by additional protection such as shielding. The control apparatus 108 may also communicate with a security center (e.g., a police station, an alarm center, or the like) when it determines that a break-in attempt is being made with the vehicle 102). In other examples, the control apparatus may be hidden from view so that intruders cannot easily locate the device and interfere with the operation of the device.

In one example of the operation of the system of FIG. 1, the communication link 110 is established between the control apparatus 108 and the transponder 104 at the vehicle 102. The vehicle 102 is located in the immediate vicinity of the location. For instance, the vehicle may be located immediately in front of the control apparatus 108, or within a small distance (e.g., somewhere within a parking garage) so that it is within the communication range of the control apparatus 108. In this respect, one control apparatus can be used for multiple parking spots (e.g., such as those within all or portions of a parking garage) or one control apparatus may be used for each spot or two spots (e.g., at a parking meter).

Subsequently and responsively, the control apparatus 108 monitors for a continued presence of the vehicle 102 in the vicinity of the location via the communication link 110. For example, the control apparatus may continuously "ping" the transponder 104 with a signal and determine if an acknowledgement is received. In so doing, the control apparatus determines the vehicle 102 is still at the location 106. In other words, if the link 110 is determined to be broken or non-existent, the control apparatus 108 will assume that the vehicle 102 is no longer at the location.

In one particular example, the control apparatus 108 determines whether a first valid user authorization signal has been received over the communication link 110. The first valid user authorization signal indicates that a user is securing the vehicle 102. The control apparatus 108 determines when a second valid user authorization signal has been received. The second valid user authorization signal indicating the authorized departure of the vehicle 102 from the immediate vicinity of the location 106. When the continued presence of the vehicle 102 is no longer detected and when a valid second user authorization signal has not been received, an alarm is initiated. For example, the control apparatus 108 may send a message to a security center or directly to the police. Additionally, alarms, sirens, or other such devices may be activated in the vicinity of the vehicle 102 in an attempt to discourage what may be an ongoing vehicle theft attempt.

As mentioned, the control apparatus 108 may monitor for the continued presence of the vehicle in a variety of ways. For example, the control apparatus 108 may periodically monitor for the continued presence of the vehicle by periodically sending out signals (e.g., once per minute) and waiting for an acknowledgement. For instance, the control apparatus may transmit an inquiry message to the vehicle and monitor for a response message received from the transponder 104 at the vehicle 102.

The communication link 110 may also be established in a variety of different ways. For example, the control apparatus 108 may determine whether an identifier associated with and received from the transponder 104 is associated with an authorized user.

The user authorization signals may also follow a variety of different formats. For instance, the first valid user authorization signal and the second valid user authorization signal may include the same password or different passwords. The control apparatus in this case may determine that a valid user authorization signal has been received by comparing the received password to a pre-stored password.

In other examples, the vehicle user may pay for parking. A single control apparatus may be used for an area or each parking meter may have its own control apparatus. In this case, the control apparatus 108 receives a monetary payment from the user (or indication of a monetary payment where the user pays at another device and this other device communicates payment information to the control apparatus 108) and responsively sends a valid password to the transponder 104 at the vehicle 102.

In still other examples, indicators may be used to show when the link 110 is established (and when it no longer exists). For example, a visible indicator (e.g., LED, LCD display, or the like) may be actuated when the communication link is established. The indicator may be at the control apparatus, vehicle, or both.

In other aspects, the control apparatus 108 may act as a parking controller. For example, at a database (either at the control apparatus 108 or at some other location that communicates with the control apparatus 108) the identity of at least one allowed user for at least one predetermined parking area 112 is stored. A number of vehicles located in the at least one predetermined area and a predetermined limit are also stored in the database. These approaches are advantageous in preventing unauthorized uses of parking spaces such as disabled spaces to name one example. In areas with residential parking permits, parking can be enforced during certain hours, property values may increase. Neighboring parking garages may likely receive increased revenue as parkers park at these garages.

The control apparatus 108 compares the user to the at least one allowed user to determine if the user is allowed to park in the at least one predetermined parking area. The control apparatus determines whether the at least one predetermined parking area is full based upon the number of vehicles indicated to be located in the at least one predetermined parking area and the predetermined limit. When the at least one predetermined parking area is determined to be full, the control apparatus 108 sends a message to an external parking control entity (e.g., a staffed parking control center, the police, to name two examples).

The control apparatus 108 may communicate with other controllers to determine (when no parking exists in the area 112) whether alternative parking exists in other parking areas (controlled by the other control apparatus). In this respect, a network of control devices can be formed and communicate with each other and determine where available parking exists.

In other examples, each parking station may have a number (e.g., a three digit number) printed on it. When a vehicle is to be parked, the driver (or other user) types in this number and the control apparatus attempts to associate the vehicle with the parking space. If the user is not authorized, in some cases they may be allowed to pay for the parking and enter credit card or other payment details. A parking map of the cars parking in the area can also be created. The number of illegally parked cars can be determined since the number of legally parked cars is known. These approaches discourage drivers from parking illegally in crowded areas because enforcement is fast and accurate.

An indicator (e.g., a light) can be used to show whether parking spots are available and a driver can choose not to drive on that area in search of a parking space. The indicator may be at or near the control apparatus or in the vehicle to name two examples.

As described herein, a user can type in a password to lock their car and prevent its theft in addition to register its parking. These same locking procedures can be used by vehicles in areas that do not have parking restrictions but do have parking monitoring stations (i.e., the control apparatus described herein).

It will be appreciated that in many of these examples the control apparatus 108 is a stand-alone controller. That is, the control apparatus 108 does not need or depend upon instructions or control from any other device (although it may communicate with other devices). In this respect, the control apparatus 108 itself determines, among other things, whether a vehicle has been illegally entered, driven away, or is authorized to park in an area under the control of the control apparatus 108.

Figure 2:
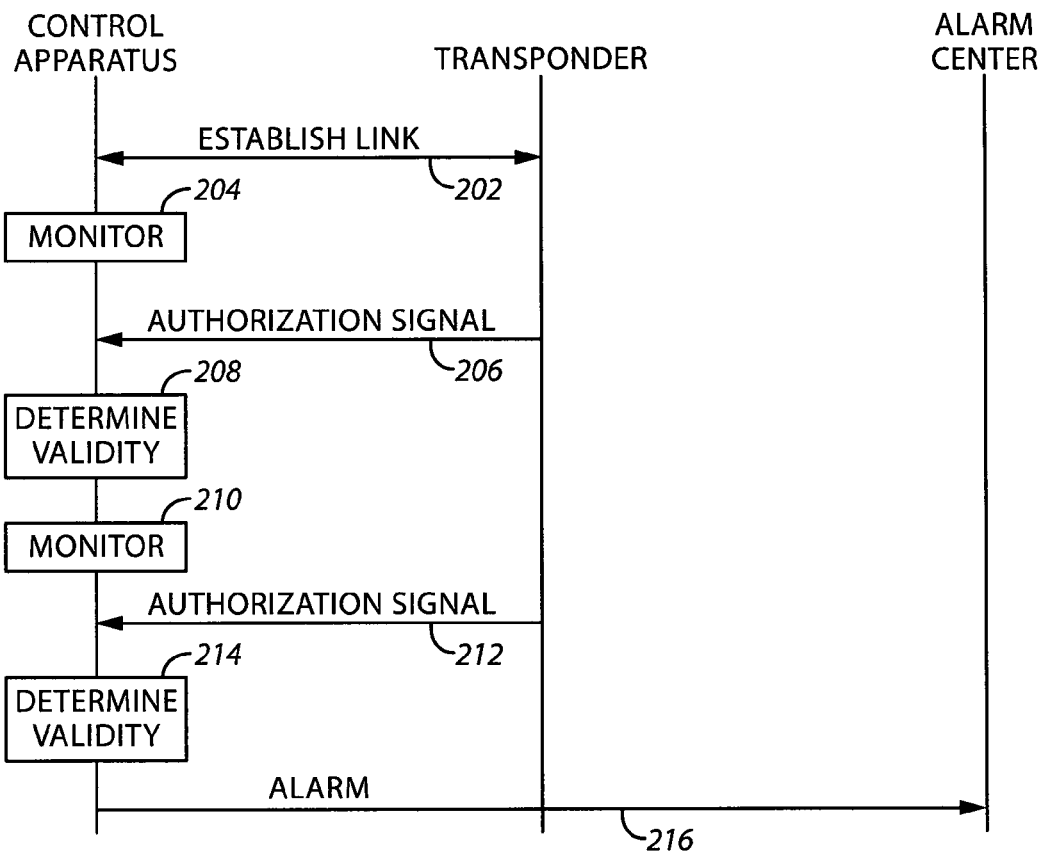
FIG. 2 comprises a flowchart of one example of an approach for operating a security system according to various embodiments of the present invention.

Referring now to FIG. 2, one approach for providing vehicle security is described. At the control apparatus that is positioned at a location external to a vehicle, a communication link is established with a transponder at the vehicle at step 202. The vehicle is located in the immediate vicinity of the location. For instance, the vehicle may be in a parking spot immediately adjacent to the control apparatus. In another example, the vehicle is in a parking garage.

At step 204, the continued presence of the vehicle in the vicinity of the location via the communication link is monitored. The control apparatus determines whether a first user authorization signal has been received over the communication link at step 206 and its validity is determined at step 208. The first valid user authorization signal indicates that a user is securing the vehicle. At step 210, the control apparatus continues to monitor the link.

At step 212, the control apparatus determines when a second user authorization signal has been received and at step 214 its validity is determined. The second valid user authorization signal indicates the authorized departure of the vehicle from the immediate vicinity of the location. When the continued presence of the vehicle is no longer detected and when a valid second user authorization signal has not been received, at step 216 an alarm is initiated.

Figure 3:
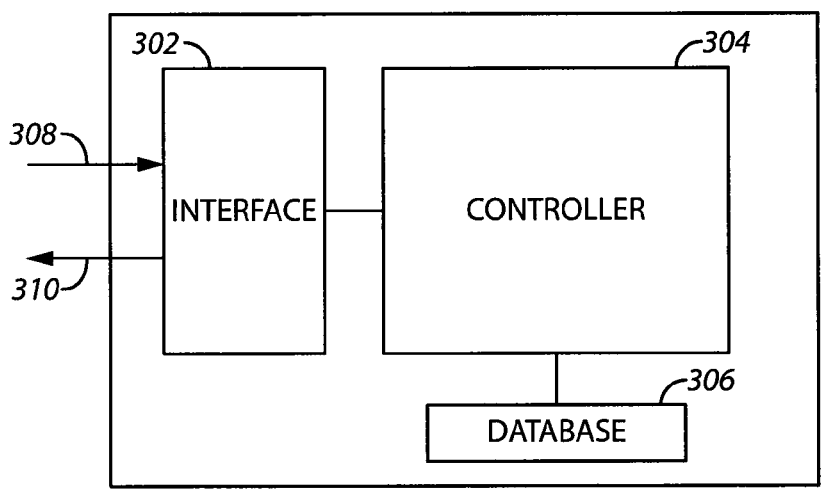
FIG. 3 comprises a block diagram of a control apparatus for providing security and/or parking services according to various embodiments of the present invention.

Referring now to FIG. 3, one example of a control apparatus 300 is described. The control apparatus 300 includes an interface 302, a controller 304, and a database 306. The apparatus 300 is located externally from the vehicle. For example, the apparatus 300 may be located at, within the housing of, or near a parking meter or at or near a parking garage. The apparatus 300 may be a stand-alone device (e.g., it is not incorporated into another housing or device) or incorporated into another device (e.g., incorporated into a parking meter).

The interface has an input 308 and output 310. The input 308 and output 310 are configured to transmit and receive signals (e.g., to and from a transponder, an alarm center, a parking control center, or other control devices to name a few examples). In this respect the interface 302 may include one or more antennas, modems, or the like to communicate with other entities in a wired and/or wireless manner according to any communication protocol.

The controller 304 is coupled to the interface and configured to determine whether a first valid user authorization signal has been received at the input of the interface 302. The first valid user authorization signal indicates that the user is securing the vehicle and the controller is further configured to subsequently and responsively monitor for a continued presence of the vehicle in the immediate vicinity of the location using the interface 302 or control apparatus 300.

In another aspect, the database 306 may store the identity of at least one allowed user for at least one predetermined parking area. A number of vehicles located in the at least one predetermined area, and a predetermined limit are also stored at the database 306.

The controller 304 compares the user to the at least one allowed user to determine if the user is allowed to park in the at least one predetermined parking area. The controller 304 determines whether the at least one predetermined parking area is full based upon the number of vehicles indicated to be located in the at least one predetermined parking area and the predetermined limit. When the at least one predetermined parking area is determined to be full, the controller 304 sends a message to an external parking control entity at the output 310 of the interface 302.

Figure 4:
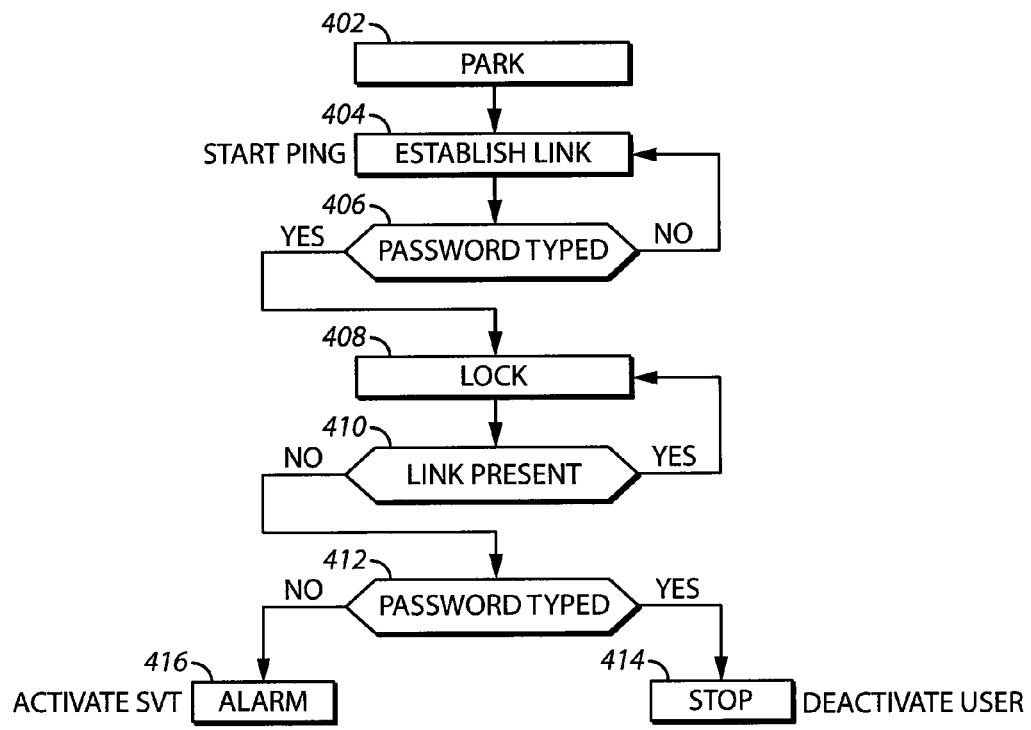
FIG. 4 comprises a flowchart for providing security services according to various embodiments of the present invention.

Referring now to FIG. 4, one example of an approach for providing security at a vehicle is described. At step 402, the user parks the vehicle. At step 404, a communication link is established and pinging of the vehicle begins. The pinging of the transponder of the vehicle may be done periodically, in one example.

At step 406, it is determined if a password has been entered. If the answer is negative control returns to step 406. If the answer is affirmative, at step 408, the user locks their vehicle.

At step 410, the control apparatus monitors for the presence of the link and determines whether the link is present. If the answer is affirmative, control returns to step 408. If the answer is negative, control continues with step 412 when it is determined if a password has been entered by the user. If the answer is affirmative, at step 414 control ends. If the answer is negative, then an alarm is activated at step 416. For example, an alarm may be sent to an appropriate security center where steps may be taken to halt the theft of the vehicle.

Figure 5:
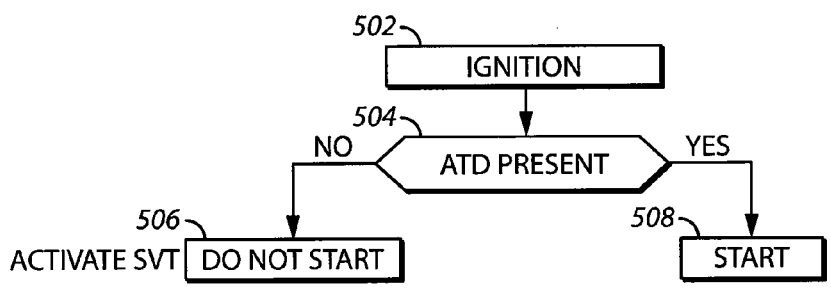
FIG. 5 comprises a flowchart for operating a security system according to various embodiments of the present invention.

Referring now to FIG. 5, one example of an approach for starting the vehicle is described. At step 502, ignition of the vehicle is attempted. At step 504, it is determined whether the control apparatus is present. If the answer is affirmative, then, the vehicle is started. If the answer is negative, the vehicle is not started.

Using these approaches, if desired to link ignition action (engine start) with the presence of the control apparatus so that the vehicle will not start if the control apparatus is disconnected from the vehicle. The presence of the control apparatus can be determined by, for example, software approaches (e.g., bus communication, sending byte strings, and so forth) or hardware methods (e.g., using connector pins that are condition by the presence of the control apparatus to name one example). Other examples are possible.

Figure 6:
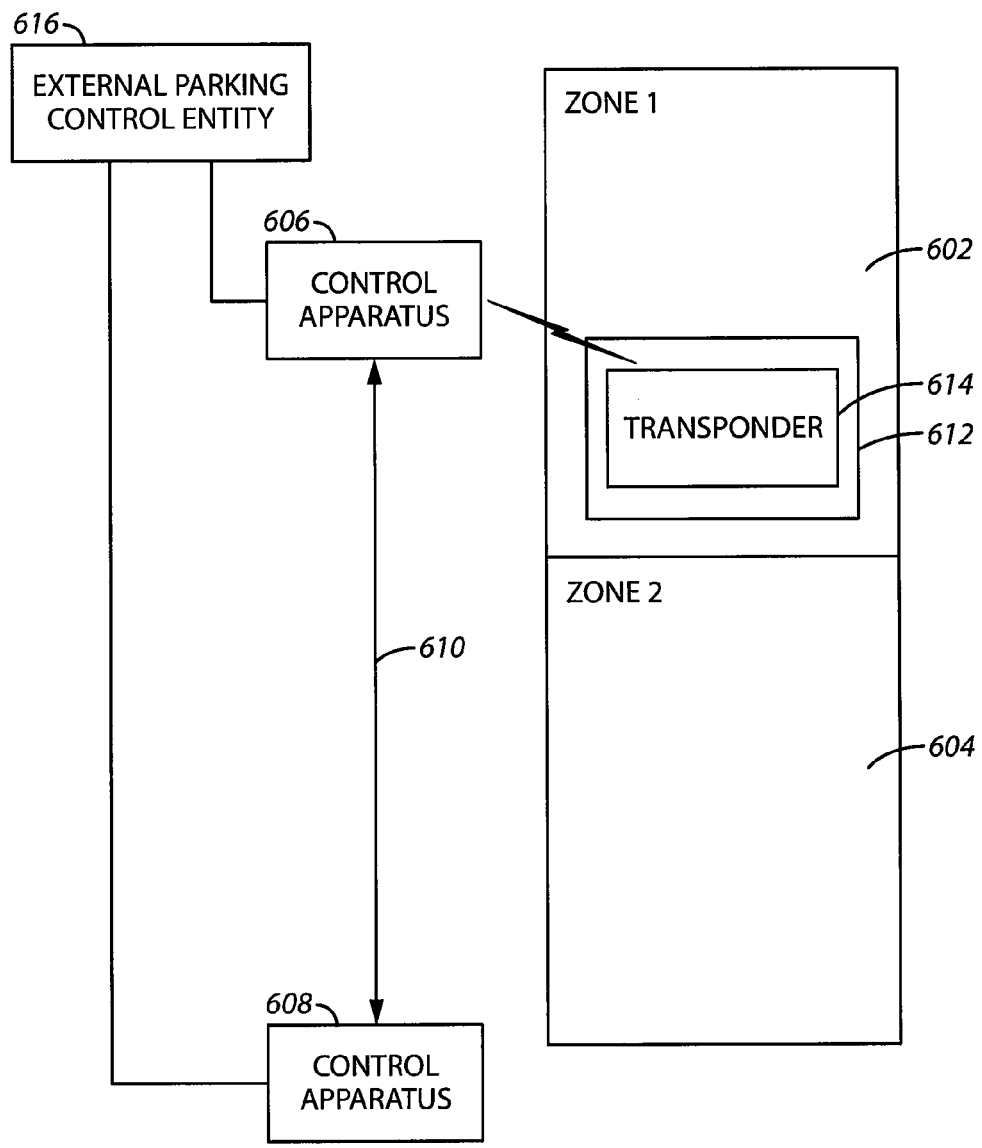
FIG. 6 comprises a block diagram of an approach for providing parking services according to various embodiments of the present invention.

Referring now to FIG. 6, one example of a system for controlling parking in one or more parking areas is described. An area is divided into a first parking zone 602 and a second parking zone 604. The first parking zone 602 is controlled by a first control apparatus 606 and the second parking zone 604 is controlled by a second control apparatus 608. The first control apparatus 606 and the second control apparatus 608 communicate with each other via a communication link 610. The communication link 610 may be any type of wired or wireless communication link operating according to any wired or wireless protocol. In addition, one or both of the first control apparatus 606 and the second control apparatus 608 may communicate with other controllers, the police, a parking center, or any other entity.

In one example of the operation of the system of FIG. 6, at least one allowed user for at least one predetermined parking area is stored in a database at the first control apparatus 606. The first control apparatus 606 monitors for the presence of the at least one allowed user in a vehicle 612 at the parking area 602. The first control apparatus 606 receives a message from a transponder 614 in the vehicle 612 indicating that the allowed user is attempting to park the vehicle 612 in the at least one pre-determined parking area 602.

When the message is received, the first control apparatus 606 determines whether the at least one predetermined parking area is full based upon a number of vehicles indicated to be located in the at least one predetermined parking area 602 and a predetermined limit. When the area 602 is determined to be full, the first control apparatus 606 sends a message to an external parking control entity 616.

The first control apparatus 606 may construct a parking map of the at least one predetermined parking area. More specifically, a map can be constructed showing where vehicles are parked, the owner of a vehicle, how long the vehicle has been or is allowed to park, and so forth. This map may be shared with the external parking control entity 616.

The first control apparatus may receive a password from the user to associate the at least one user to the at least one predetermined parking area 602. In another example, the user or driver may communicate payment details to the first control apparatus 606 and receive a password and, consequently, permission to park in the area 602.

In other examples, the first control apparatus 606 may communicate with the second control apparatus 608, the external parking control entity, or both and may determine an alternate place to park (e.g., in the second parking zone 604) based upon the information received during the communicating. The first control apparatus 606 may communicate the alternate parking information to the at least one user.

Figure 7:
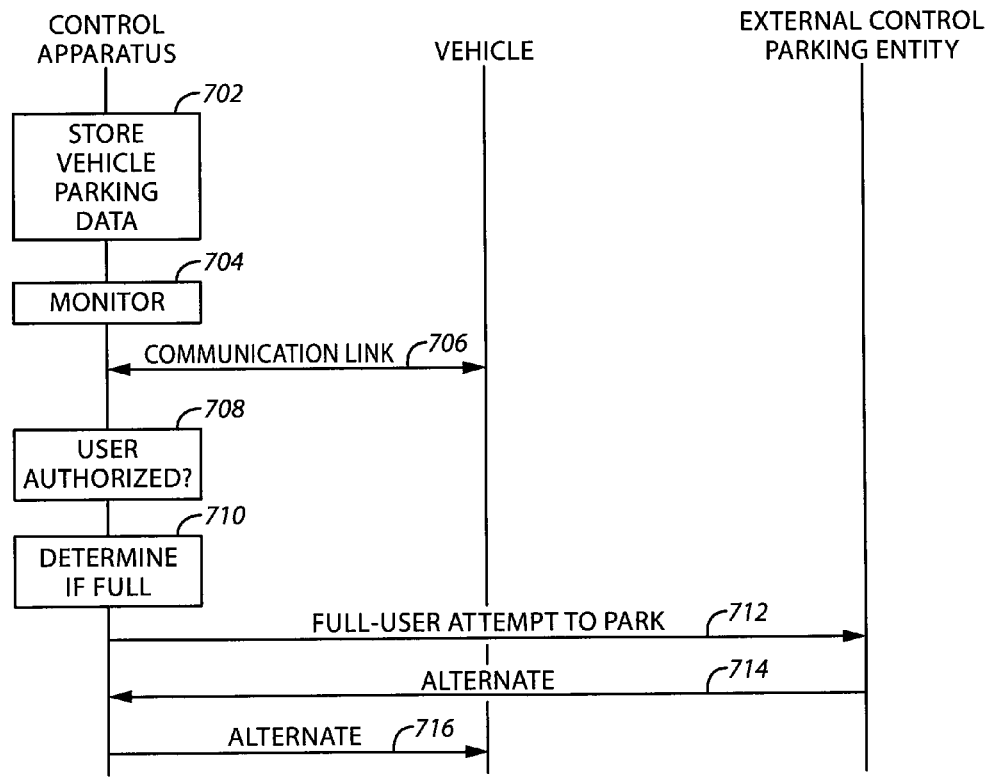
FIG. 7 comprises a flowchart for providing parking services according to various embodiments of the present invention.

Referring now to FIG. 7, one example of an approach for controlling parking is described. At step 702, at least one allowed user for at least one predetermined parking area is stored in a database. At step 704, the presence of the allowed user in the pre-determined parking area is monitored. A message from the allowed user that is attempting to park a vehicle in the at least one pre-determined parking area is received via a communication link 706 and, at step 708, it is determined if the user is authorized to park. When the message is received, at step 710 it is determined whether the at least one predetermined parking area is full based upon a number of vehicles indicated to be located in the predetermined parking area and a predetermined limit.

At step 712, when the area is determined to be full, a message is sent to an external parking control entity. At step 714, information indicating an alternative parking area may be received at the control apparatus. At step 716, the alternative parking information is sent to the user in the vehicle. Consequently, the driver of the vehicle can proceed to the alternative parking area.

Figure 8:
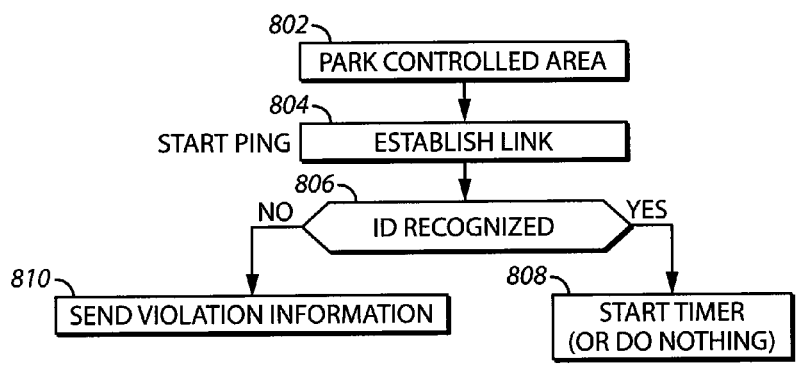
FIG. 8 comprises a flowchart for providing parking services according to various embodiments of the present invention.

Referring now to FIG. 8, one example of an approach for controlling parking access of a controlled area is described. At step 802, a user parks their vehicle in a controlled area. At step 804, a communication link is established with a parking control apparatus that is positioned external to the vehicle. At step 806, it is determined whether the identification information supplied by the vehicle to the control apparatus is recognized. If the answer is affirmative, then at step 808 a timer is started (to determine when the user must leave the space). Alternatively, a timer need not be started (e.g., if the vehicle is allowed to park for an unlimited amount of time in the parking space) and nothing else need be done. If the answer at step 806 is negative, then at step 810 parking violation information may be sent to a parking control center, the police, or some other entity that can issue a violation notice to the vehicle.

Thus, approaches are provided where vehicle security can be provided by a control apparatus that is external to the vehicle and cannot be disabled by an intruder. Thus, reliable security protection is provided that cannot be easily disabled by criminals or other unauthorized individuals. In addition or instead of providing vehicular security, parking services can be provided whereby unauthorized vehicles can be prevented from occupying parking spaces and alternative parking information can also be provided to a user when a given parking location is full. The approaches described herein are easy to implement, and cannot be disabled by unauthorized persons that tamper with a vehicle or the contents of the vehicle.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of monitoring a location of a vehicle having a wireless communications transponder, relative to a control apparatus configured to transmit and receive wireless communications signals, the method comprising:
at a location external to the vehicle:
determining that the vehicle is parked in the immediate vicinity of the control apparatus by establishing a wireless communication link between the transponder with the vehicle and the control apparatus; and
subsequently and responsively monitoring for a continued presence of the vehicle in the vicinity of the location via the communication link.

2. The method of claim 1 further comprising:
at the location external to the vehicle:
determining whether a first valid user authorization signal has been received over the communication link, the first valid user authorization signal indicating that a user is securing the vehicle.

3. The method of claim 2 further comprising:
at the location external to the vehicle:
determining when a second valid user authorization signal has been received, the second valid user authorization signal indicating the authorized departure of the vehicle from the immediate vicinity of the location;
when the continued presence of the vehicle is no longer detected and when a valid second user authorization signal has not been received, initiating an alarm.

4. The method of claim 3 wherein monitoring for the continued presence of the vehicle comprises periodically monitoring for the continued presence of the vehicle.

5. The method of claim 4 wherein the monitoring comprises transmitting an inquiry message to the vehicle and monitoring for a response message received from the transponder at the vehicle.

6. The method of claim 1 wherein establishing the communication link comprises determining whether an identifier associated with and received from the transponder is associated with an authorized user.

7. The method of claim 3 wherein the first valid user authorization signal and the second valid user authorization signal include the same password.

8. The method of claim 7 wherein determining whether a valid user authorization signal has been received comprises comparing the received password to a pre-stored password.

9. The method of claim 1 further comprising receiving a monetary payment from the user and responsively sending a valid password to the transponder at the vehicle.

10. The method of claim 1 further comprising actuating a visible indicator when the communication link is established.

11. The method of claim 1 further comprising:
storing in a database at least one allowed user for at least one predetermined parking area, a number of vehicles located in the at least one predetermined area, and a predetermined limit;
comparing the user to the at least one allowed user to determine if the user is allowed to park in the at least one predetermined parking area;
determining whether the at least one predetermined parking area is full based upon the number of vehicles indicated to be located in the at least one predetermined parking area and the predetermined limit;
when the at least one predetermined parking area is determined to be full, sending a message to an external parking control entity.

12. An apparatus for providing security for a vehicle, the apparatus located externally from the vehicle, the apparatus comprising:
an interface having an input and output, which are configured to receive and transmit wireless signals;
a controller, the controller coupled to the interface and configured to determine whether the vehicle is parked in the immediate vicinity of the apparatus by establishing a wireless communication link between the vehicle and the apparatus, the controller being additionally configured to determine whether a first valid user authorization signal has been received at the input of the interface, the first valid user authorization signal indicating that the user is securing the vehicle, the controller being further configured to subsequently and responsively monitor for a continued presence of the vehicle in the immediate vicinity of the location using the interface.

13. The apparatus of claim 12 wherein the controller is further configured to determine when a second user authorization signal has been received at the input of the interface, the second valid user authorization signal indicating the authorized departure of the vehicle from the immediate vicinity of the location, the controller being further configured to, when the continued presence of the vehicle is no longer detected and when a valid second user authorization signal has not been received, initiate an alarm at the output of the interface.

14. The apparatus of claim 13 wherein the first valid user authorization signal and the second valid user authorization signal comprise the same password.

15. The apparatus of claim 14 wherein the controller is further configured to determine whether a valid user authorization signal has been received by comparing the password to a pre-stored password.

16. A method of managing one or more parking areas for vehicles having a wireless communications transponder, the method comprising:

storing in a database at least one allowed user for at least one predetermined parking area;

monitoring for a presence of the at least one allowed user in the immediate vicinity of at least one pre-determined parking area by establishing a wireless communications link between a transponder with a vehicle having the at least one allowed user therein, and a control apparatus for the at least one pre-determined parking area;

receiving at the control apparatus, a first message from the at least one allowed user that is attempting to park the vehicle in the at least one pre-determined parking area;

when the first message is received, determining whether the at least one predetermined parking area is full based upon a number of vehicles indicated to be located in the at least one predetermined parking area and a predetermined limit;

when the area is determined to be full, sending a second message to an external parking control entity.

17. The method of claim 16 further comprising constructing a parking map of the at least one predetermined parking area.

18. The method of claim 16 further comprising receiving a password from the at least one user to associate the at least one user to the at least one predetermined parking area.

19. The method of claim 16 further comprising communicating with the external parking control entity and determining an alternate place to park based upon the information received during the communicating.

20. The method of claim 16 further comprising communicating the alternate parking information to the at least one user.

* * * * *